United States Patent [19]

Neuerburg

[11] 4,443,998
[45] Apr. 24, 1984

[54] MOWER HAVING AN IMPROVED CUTTER BAR

[75] Inventor: Horst Neuerburg, Haegen, France

[73] Assignee: Kuhn, S.A., Saverne, France

[21] Appl. No.: 330,272

[22] Filed: Dec. 14, 1981

[30] Foreign Application Priority Data

Dec. 19, 1980 [FR] France ............................ 80 27569

[51] Int. Cl.³ .......................................... A01D 35/26
[52] U.S. Cl. ...................................... 56/13.6; 36/295
[58] Field of Search ............... 56/13.6, 157, 235, 295, 56/192, 255, 256

[56] References Cited

U.S. PATENT DOCUMENTS

| | | | |
|---|---|---|---|
| 3,513,648 | 5/1970 | Kline et al. ........................... | 56/13.6 |
| 3,524,306 | 8/1970 | Reber ................................... | 56/13.6 |
| 4,149,359 | 4/1979 | Van Derlely ........................ | 56/13.6 |
| 4,183,196 | 1/1980 | Oosterling et al. .................. | 56/13.6 |
| 4,253,294 | 3/1981 | Zweegers ............................. | 56/13.6 |

FOREIGN PATENT DOCUMENTS

| | | | |
|---|---|---|---|
| 2822686 | 11/1978 | Fed. Rep. of Germany ....... | 56/13.6 |
| 2825665 | 1/1979 | Fed. Rep. of Germany ....... | 56/13.6 |
| 1,212,892 | 11/1970 | United Kingdom ................. | 56/13.6 |
| 1433982 | 4/1976 | United Kingdom ................. | 56/13.6 |

*Primary Examiner*—Robert Peshock
*Assistant Examiner*—John G. Weiss
*Attorney, Agent, or Firm*—Ernest F. Marmorek

[57] ABSTRACT

A mower having a casing comprising an upper and a lower portion, a plurality of disks, each provided with cutting means. The improvement comprising securing means for interconnecting the upper and lower portions of said casing and bracing means for keeping the upper and lower portions of said casing at a set distance from one another.

6 Claims, 2 Drawing Figures

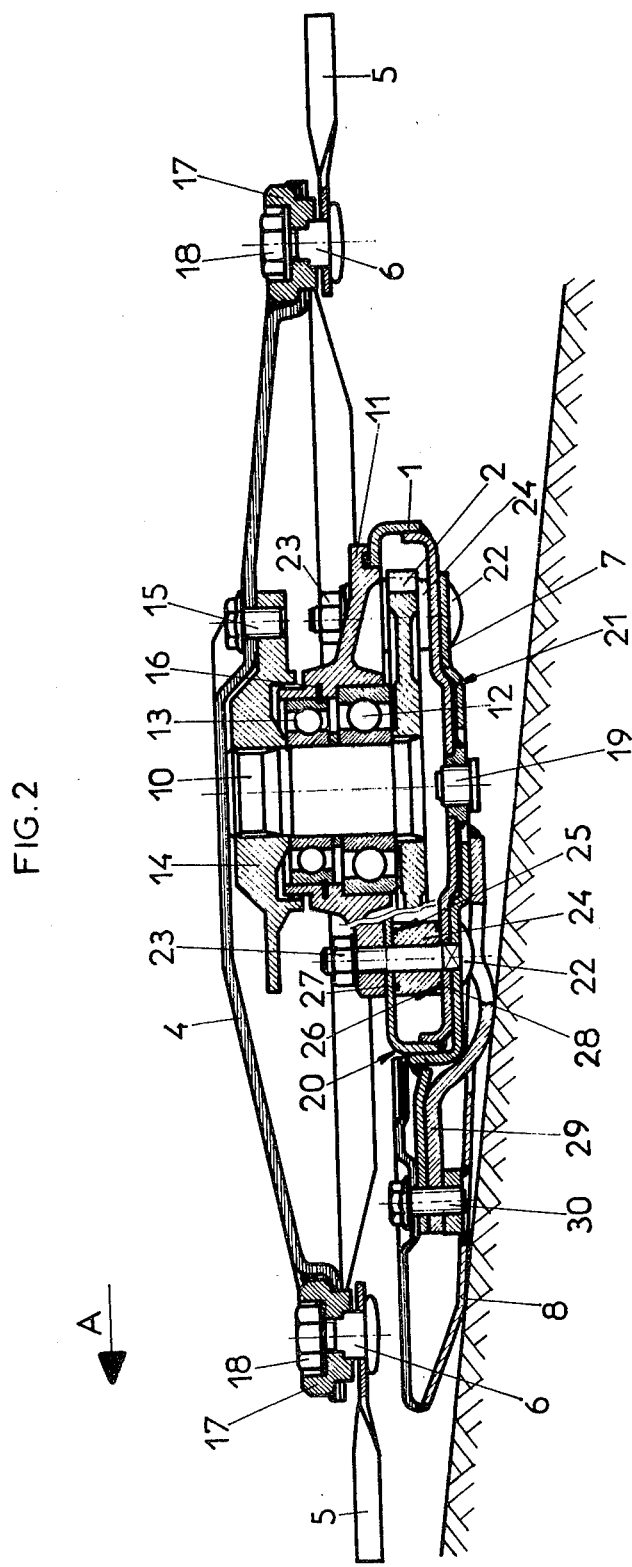

MOWER HAVING AN IMPROVED CUTTER BAR

The present invention relates to a disk mower having a casing housing a plurality of transmission means for the purpose of driving disks located above said casing from below.

Each disk is fitted with at least one cutting tool and is guided in its rotation in a disk bearing block.

In operation, the casing of such a mower slides over the ground by means of disk-protecting skids so as to cut the forage as short as possible, while avoiding interference between the disks and obstacles such as bumps in the ground or stones for example.

In order to minimise the effect that shocks sustained by the disk-protecting skids have on the casing, the said disk-protecting skids can be fixed directly to the disk bearing blocks or secured to a plate, itself fixed to the disk bearing blocks.

Moreover, cutter bars are conceivable whose disk bearing blocks are fixed to the casing by securing means passing through the casing such that each disk bearing block is detachable individually without the need to open up the entire casing.

The present invention makes it possible to obtain a very rigid connection between the disk-protecting skids or the plate and the disk bearing blocks, or between the latter and the casing, while enabling the casing to correctly perform its task of protecting the transmission elements, holding the lubricating oil and serving as a beam giving its rigidity to the cutter bar.

To this end, the mower in accordance with the invention has at least one bracing element which extends inside said casing.

In accordance with another feature of the invention, each bracing element has one or more means ensuring the sealing of the casing at the points where the securing means pass through said casing.

Further features and advantages of the invention will become apparent in the following, in no way limiting description of one embodiment of the invention and from reference to the attached drawings in which:

FIG. 2 shows a sectional view of the casing through the vertical plane containing the axis I—I defined in FIG. 1.

Figure 1:
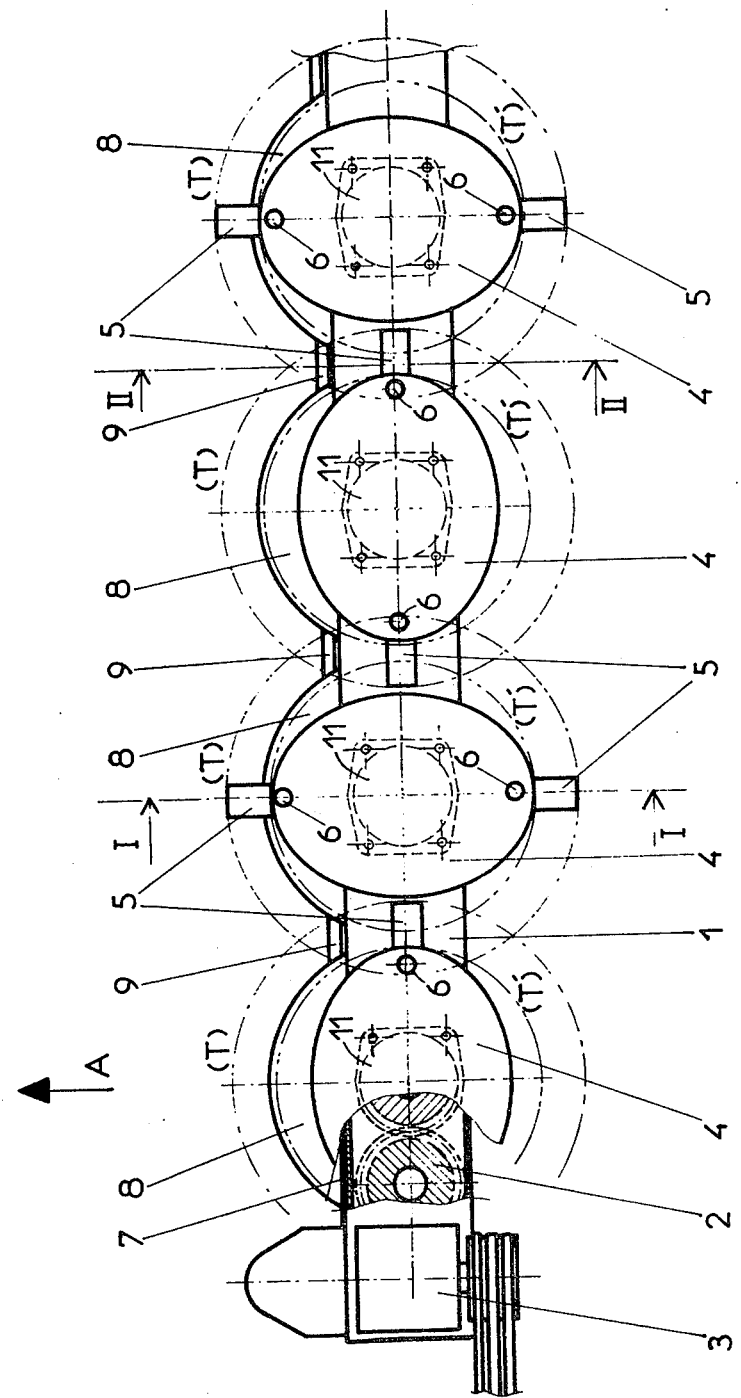
FIG. 1 shows a top view of a disk mower in accordance with the invention.

In FIG. 1, the mower in accordance with the invention has a casing (1) housing a series of gears (2) driven so as to rotate from the power takeoff of a tractor (not shown) by a known mechanism (3) such as an angle drive unit, pulleys and belts for example. The gears (2) drive disks (4) fitted with two diametrically opposed knives (5) capable of turning freely about spindles (6) provided in the disks (4). The knives (5) are held in their working position under the influence of the centrifugal force and therefore follow circular paths (T) when the disks (4) are made to rotate. A plate (7) fixed to the disk bearing blocks (11) extends over the leading edge and under the lower face of the casing (1).

Disk-protecting skids (8) are fixed on this plate. At the front, viewed in the direction of the arrow A, these exhibit a circular sector having a radius which is greater than the radius of the paths (T') followed by the disks (4) but smaller than the radius of the paths (T) followed by the knives (5). As a result, the disks (4) are protected against any obstacle that might be presented by the ground over which the mower is operating. The knives (5) alone are not protected against shocks, but as these are mounted freely on the disks (4) by means of the spindles (6), they can easily swing back under the disks (4) and reassume their working position as soon as the obstacle is passed.

Scrapers (9), preventing accumulations of earth which could impair mowing performance, are provided on the plate (7) in the zones between two neighbouring disks (4).

These scrapers (9) extend in front of said plate (7) in the direction of forward movement of the mower indicated by the arrow A and over a length such that they join at least two neighbouring disk-protecting skids (8).

In FIG. 2, it can be seen that the gear (2) housed in the casing (1) is integral with a shaft (10) guided in its rotation in a disk bearing block (11) by means of bearings (12 and 13). The upper part of the shaft (10) is rigidly connected to an entrainment means (14) on which the disk (4) is fixed by means of four screws (15) only one of which is shown. The assembly comprising the gear (2), shaft (10), bearing (12), bearing (13) and entrainment means (14) is held axially in the disk bearing block (11) by means of a circlip (16). Two rings (17), in which the spindles (6) securing the knives (5) are located, are welded to the periphery of the disk (4) at diametrically opposed points. These spindles are secured in the rings (17) by means of the nuts (18). The threaded plug (19) fixed underneath the casing (1) serves as a drain plug for the lubricant contained in the casing (1).

A plate (7), which covers the leading edge (20) and the underside (21) of the casing (1), extends under the casing (1). In this way, the rigidity of the casing (1) is advantageously augmented and its leading edge (20) and its underside (21) are protected against any obstacle that might come between two neighbouring disk-protecting skids (8) to prevent wear.

These disk-protecting skids (8) are fixed with the aid of the screws (30) to supports (29) welded to the plate (7). Said plate (7) is advantageously fixed to the disk bearing blocks (11) by means of four fixing assemblies for each bearing block, only one of which is shown, in section, in FIG. 2, and each comprising a screw (22) and a nut (23).

Inside the casing (1), bracing elements (24) through which the screws (22) pass, make it possible to obtain a very rigid connection between the plate (7) and the disk bearing blocks (11).

This rigid connection can be obtained while enabling the casing (1) to correctly perform its task of providing protection and holding the oil lubricating the gears (2) and its task of making the cutter bar more rigid.

In accordance with one preferred embodiment of the invention, the bracing elements (24) exhibit the form of a cylindrical tube.

It is quite obvious that it will not be going beyond the bounds of the invention if the external form of the bracing elements (24) is not cylindrical and if they exhibit the form of a parallelepiped for example.

The upper and lower faces of the bracing elements (24) are provided with grooves (25 and 26) into which means (27 and 28), such as O-rings for example, are introduced to seal the casing (1). In accordance with one variant of the invention, the bracing elements (24) can be constituted by a synthetic material with slight flexibility. In this case, the bracing elements (24) themselves would seal the casing (1) when the screws (22) and nuts (23) are tightened.

The arrangement of the bracing elements (24) inside the casing (1) also makes it possible to ensure that the internal, upper and lower faces of said casing (1) are substantially parallel, eliminating the risk of a gear (2) rubbing against one of these faces.

It is quite obvious that the preceding description only illustrates one embodiment example, it being well understood that modifications, improvements or additions can still be made to it without thereby going beyond the bounds of the present invention.

I claim:

1. In a mower including a casing comprising an upper and a lower portion; a plurality of disks located above said casing each provided with cutting means;

said upper portion including bearing block means supported by said casing and secured thereto, at least one of said disks being guided by said bearing block means; and transmission means located in said casing driving at least said one disk;

the improvement comprising, a plurality of securing means interconnecting the upper and lower portions of the casing and being operable to secure said bearing block means to said casing; and a plurality of bracing means each positioned adjacent a securing means and abutting the inner surfaces of the upper and lower portions of said casing thereby bracing the casing.

2. In a mower as claimed in claim 1, wherein said bracing means surrounds said securing means.

3. In a mower as claimed in claim 2, wherein said bracing means is constituted by a synthetic material.

4. In a mower as claimed in claim 2, wherein said bracing means further comprises sealing means.

5. In a mower as claimed in claim 4, wherein said bracing means have grooves in the upper and lower faces thereof and said sealing means comprises O-rings lodged in said grooves.

6. In a mower including a casing comprising an upper and a lower portion, normally about horizontal in use; a plurality of disks located above said casing each provided with cutting means;

said upper portion including a bearing block supported by said casing and secured thereto, at least one of said disks being guided by said bearing block; and transmission means in said casing driving at least said one disk;

the improvement comprising, a plurality of securing means traversing and interconnecting the upper and lower portions of the casing and being operable to secure said bearing block to said casing; and a plurality of bracing means each positioned adjacent and surrounding a securing means and abutting the inner surfaces of the upper and lower portions of said casing thereby bracing the casing;

said bracing means have grooves in the upper and lower faces thereof and further comprises sealing means;

said sealing means comprises O-rings lodged in said grooves.

* * * * *